United States Patent [19]

Rivero-Olmedo

[11] Patent Number: 4,669,305
[45] Date of Patent: Jun. 2, 1987

[54] METER BOX

[76] Inventor: José M. Rivero-Olmedo, P.O. Box ER, Carolina, P.R. 00628

[21] Appl. No.: 781,785
[22] Filed: Sep. 30, 1985
[51] Int. Cl.⁴ .............................................. G01F 15/18
[52] U.S. Cl. ........................................ 73/201; 285/30
[58] Field of Search ..................... 73/201, 273, 431; 137/364, 365; 285/30

[56] References Cited

U.S. PATENT DOCUMENTS

| | | | |
|---|---|---|---|
| 1,169,976 | 2/1916 | Lofton | 73/201 |
| 2,018,615 | 10/1935 | Lofton | 73/201 |
| 2,240,223 | 4/1941 | Muselier | 73/201 |
| 2,619,837 | 12/1952 | Ford | 73/201 |
| 3,111,030 | 11/1963 | Whitman | 73/201 |
| 3,212,339 | 10/1965 | Rivero Olmedo | 73/431 |
| 3,443,436 | 5/1969 | Meyer | 73/273 |
| 3,765,249 | 10/1973 | Bissell | 73/431 |
| 3,894,432 | 7/1975 | Coughlin | 73/201 |
| 3,913,400 | 10/1975 | Floren | 73/273 |
| 4,136,515 | 1/1979 | Thompson | 73/431 |

Primary Examiner—Stewart J. Levy
Assistant Examiner—John E. Chapman, Jr.
Attorney, Agent, or Firm—Lalos, Keegan & Kaye

[57] ABSTRACT

A meter box including a bottom dish having a floor, side walls, an inlet valve at one end and an outlet valve at another end passing through the sidewall. The inlet and outlet valves are integrally formed as one rigid piece with the floor and the side walls and constructed so that they are in precise alignment with each other so that a fluid meter and expansion mechanism can be installed therebetween. An upwardly extending collar is connected to the dish and a lid is secured to the upper end of the collar. A snap-fast connection releasably connects the collar to the dish and is formed as part of the collar and the dish. The inlet and outlet valves have connecting mechanisms at their outer external ends for connecting the meter box to external pipings.

11 Claims, 6 Drawing Figures

METER BOX

BACKGROUND OF THE INVENTION

The present invention relates to meter boxes and mountings for fluid meters. It more particularly relates to meter boxes for water meters of the type to be installed outdoors flush with the surface of the ground. It further relates to the construction of such meter boxes.

In the past there are numerous constructions of meter boxes known. Examples are U.S. Pat. Nos. 3,212,339, 2,619,837, and 2,018,615, the contents of all of which are hereby incorported by reference in their entirety. These typically were made from a heavy cast iron design. To assemble the meter therein was a complicated process requiring the installation (usually with bolts and nuts) of the inlet and outlet fittings to the box, the hook-up of the meter to the one fitting, and the hook-up of the meter at its other end to an expansion mechanism which was attached to the other fitting. It further was necessary to secure the middle or collar portion of the box to the bottom tray through a complicated and time consuming bolt and nut assembly. Since the fittings were separate from the mounting box itself, relative movement was frequent and fittings would become misaligned with the meter. Leaking of the fluid was thus occurring between the recess of the inlet valve and the expansion mechanism and between the meter and the recess of the outlet fitting.

OBJECTIVES OF THE INVENTION

Accordingly, it is the principal object of the present invention to provide an improved meter box for fluid meters.

Another object of the present invention is to provide an improved meter box which is lightweight.

A further object of the present invention is to provide a novel meter box design in which the installation of the meter therein is easy.

A still further object of the present invention is to provide an improved meter box design which eliminates the leaking occurring between the meter and the adjacent fittings and the expansion mechanism.

Another object of the present invention is to provide an improved meter box design which is easy to handle.

Other objects and advantages of the present invention will become more apparent to those persons having ordinary skill in the art to which the present invention pertains from the foregoing description taken in conjunction with the accompanying drawings.

DESCRIPTION OF THE PREFERRED EMBODIMENT

Figure 1:
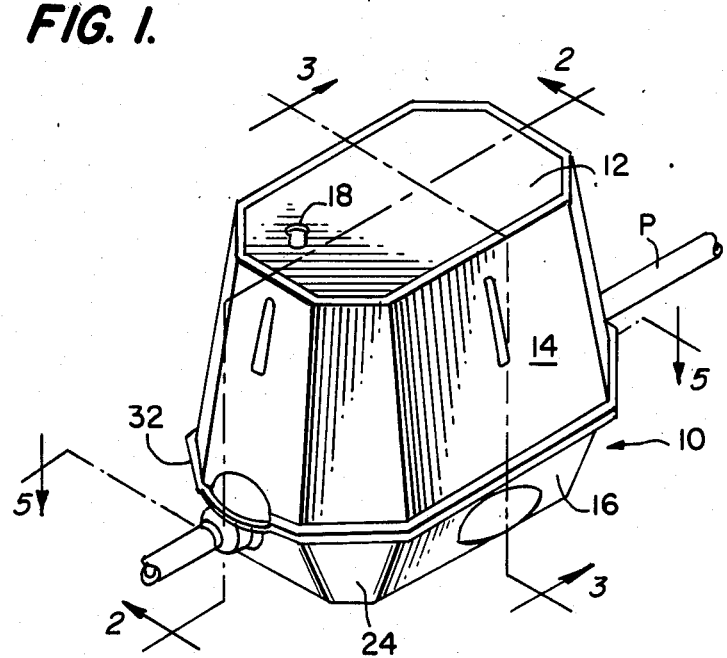
FIG. 1 is a perspective view of a meter box embodying the present invention and containing a water meter installed therein.
Figure 2:
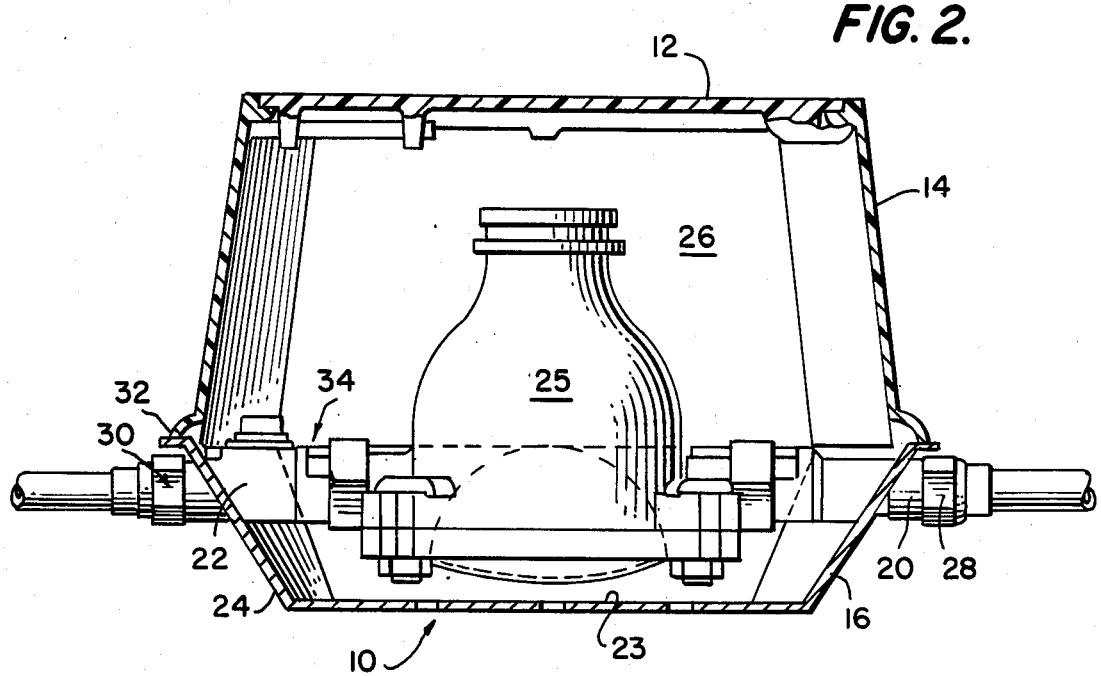
FIG. 2 is an enlarged longitudinal sectional view taken along line 2—2 of FIG. 1.
Figure 4:
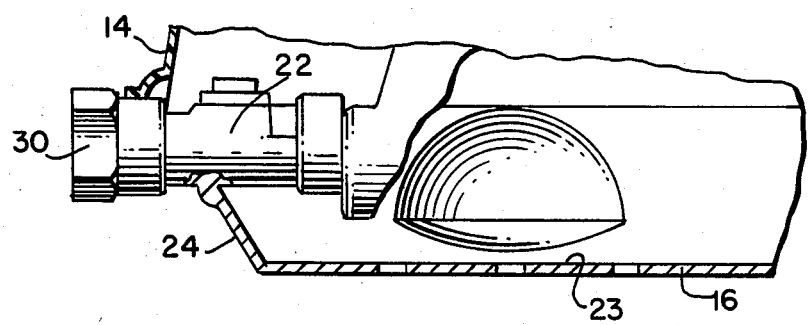
FIG. 4 is an enlarged detailed sectional view of a fragmentary portion of the meter box taken on line 4—4 of FIG. 3.
Figure 3:
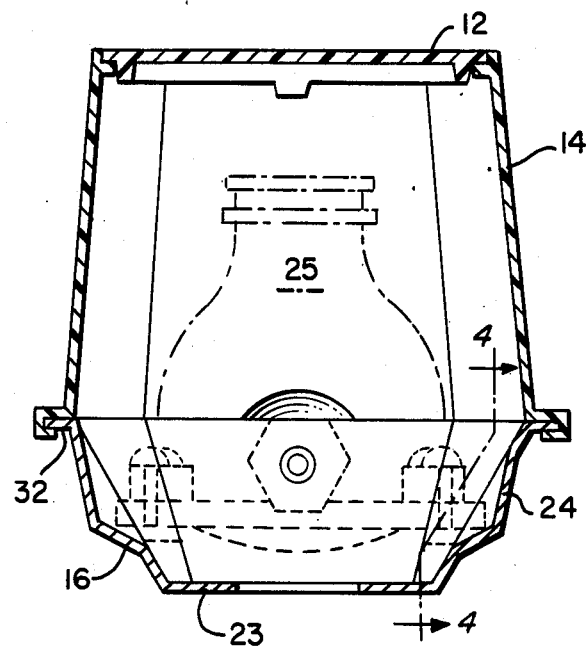
FIG. 3 is an enlarged tranverse sectional view taken along line 3—3 of FIG. 1.

Referring to FIG. 1, a meter box embodying the present invention is shown generally at 10. Meter box 10 comprises three main components: a lid 12, a middle portion or collar 14, and a bottom section or dish 16. Lid 12, collar 14 and dish 16 each have a polygonal shape, or more particularly octagonal, or any other suitable shape.

Lid 12 serves as a cover for collar 14 and dish 16. Lid 12 includes a lock-in mechanism that operates through the use of a key through a keyhole 18 in the lid. Collar 14 similarly has an polygonal or other suitable shape designed to coincide with that of lid 12. It is tapered so that its narrow portion is at its top and its wider portion at its bottom.

Figure 5:
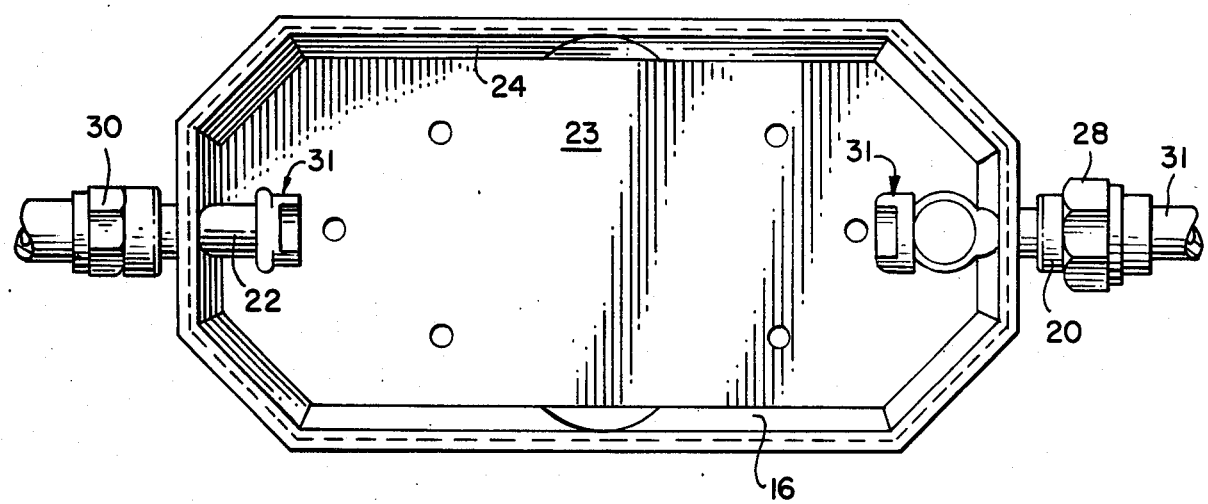
FIG. 5 is an enlarged top plan view taken along line 5—5 of FIG. 1 illustrated with the meter removed therefrom.
Figure 6:
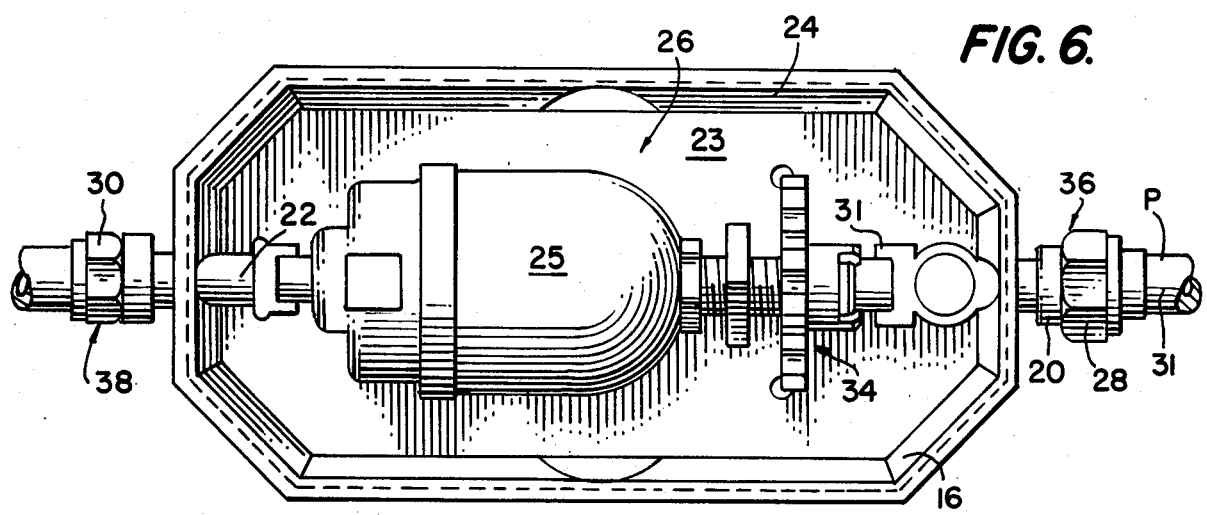
FIG. 6 is a view similar to FIG. 5 illustrating the meter box of the present invention with a meter and expansion mechanism installed therein.

Dish 16 is of a novel construction. As a part thereof, integral thereto and formed therewith are the inlet valve 20 and the outlet valve 22. Inlet valve 20 and outlet valve 22 are formed with the floor 23 and sidewall 24 of the dish and are formed in the construction process precisely and accurately aligned so that the meter 25 can be installed in the interior cavity 26 between the valves. Any suitable fluid meter 25, such as a water or gas, can be installed in box 10. These integral valve fittings are provided on the outside of the box with the necessary removable connections 28, 30 for connecting to copper pipe tubing, plastic pipe tubing or any other pipe tubing 31. As illustrated in FIG. 5, the meter 25 shown in FIG. 6 is intended to rest on a lip 31 that has the inlet valve and the outlet valve connection so that it is suspended above dish floor 23.

Inlet and outlet valves 20, 22 are molded or casted with floor 23 and wall 24 through any suitable process so as to produce an integral or monolithic part. For example, they can be injection molded, structural foam molded, or thermo foam formed. Dish 16 is manufactured of the same kind of plastic, resin, fiberglass, or any metal that can produce these items and can provide a very precise dimension between the two fittings so as to insure perfect alignment, and the manufacturing process with the integrated fittings is usually through an injection molding, structural foam molding, fiberglass or resin process. It is also shown that the dish 16 includes four or more openings in floor 23 through which fluid can drain.

Collar 14 is connected to dish 16 by a simple snap fast process 32, as best shown in FIG. 1. It does not require the use of bolts or nuts such as has been required in the past. The snap fast process is built as part of collar 14 and dish 16, and includes an elongated male member along the edge of either collar 14 or dish 16 and an elongated recessed female member on the other one and into which the male member snaps and unsnaps. It further is anticipated that collar 14 will be made of some lightweight material such as plastic thereby making the entire box 10 lighter than the cast iron boxes of the past. This will make for easier transport and installation.

Valves 20, 22 form part of dish 14 so that box 10 is not used only for the purpose of protecting meter 24 but serves as a connecting piece between the exterior fluid (water) pipeline 31 and meter 25 itself. The fittings as part of box 10 will not move in any direction relative to the box and at the same time will maintain a perfect alignment between the fittings and meter 25 that will be installed later in the box with its integrated fittings.

As shown in FIG. 6, an expansion mechanism 34 of known construction is positioned between and secured to inlet valve 20 and meter 25 and the other end of the meter is connected to outlet valve 22. The expansion mechanism is needed to make a firm seal between the inlet valve connection and the outlet connection fitting. At the outer ends of the integral box fittings are connecting devices 36 and 38 designed so that the unit can be connected to any form of piping 31 available in the marketplace.

As can be appreciated, with the precise alignment of the fittings during the manufacturing process and the firm rigid securing of the fittings to the boxes due to this construction, relative movement therebetween is not possible. It can further be appreciated that with accurate construction, the previously experienced leaking problem will not occur. Also, meter box 10 is lightweight and easy to transport and handle. The installation of the meter therein is also an easy process.

It is to be understood that the form of the invention herein shown and described is to be taken as an illustrative embodiment only of the same, and that various changes in the shape, size and arrangement of parts may be resorted to without departing from the spirit of the invention, which is limited only to the appended claims.

I claim:

1. A meter box comprising:
   a bottom dish having a floor, at least one side wall connected to said floor, an inlet valve at one end of said side wall and an outlet valve at another end,
   said inlet and outlet valves being integrally formed as one rigid piece with said floor and said side wall and constructed so that they are in alignment with each other so that a fluid meter and expansion mechanism can be installed thereto and therebetween,
   an upwardly extending collar connected to said dish,
   snap fast connection means for connecting said collar to said dish, and
   a lid secured to the upper end of said collar.

2. The meter box of claim 1 including,
   said snap fast connection means being formed as a part of said collar and of said dish.

3. The meter box of claim 2 including,
   said snap fast connection means comprising a male member on said collar and a yieldable female member on said dish into which said male member snaps and unsnaps.

4. The meter box of claim 1 including,
   a locking mechanism attached to said lid for locking said lid to said collar.

5. The meter box of claim 1 including,
   said inlet and outlet valves being molded with said dish as a single unit.

6. The meter box of claim 1 including,
   said inlet and outlet valves being cast together with said dish as a single unit.

7. The meter box of claim 1 including,
   said inlet valve including an outer end exterior of said dish including a connection device for connecting said inlet valve to exterior piping.

8. The meter box of claim 1 including,
   said outlet valve including at its end exterior of said dish a connecting mechanism for connecting said outlet valve to exterior piping.

9. The meter box of claim 1 including,
   an expansion mechanism positionable in the cavity defined between said inlet and outlet valves and positionable generally above said floor of said dish and connectable to one said valve at one end, and
   a fluid meter positionable in said cavity and connectable at one end to the other said valve and at its opposite end to said expansion mechanism.

10. The meter box of claim 1 including,
    said dish, said collar, and said lid all being of polygonal shape.

11. The meter box of claim 1 including,
    said floor having a plurality of openings passing through it to the exterior of said meter box through which fluid can drain.

* * * * *